(12) United States Patent
Ito et al.

(10) Patent No.: US 9,045,047 B2
(45) Date of Patent: Jun. 2, 2015

(54) STORAGE BATTERY

(75) Inventors: Akira Ito, Nukata-gun (JP); Mitsuru Fujita, Kuwana (JP); Kenichi Tanaka, Nagoya (JP); Yukitsugu Sakaguchi, Anjo (JP)

(73) Assignees: DENSO CORPORATION, Kariya (JP); CAPTEX CO., LTD., Nagoya-shi (JP)

( * ) Notice: Subject to any disclaimer, the term of this patent is extended or adjusted under 35 U.S.C. 154(b) by 422 days.

(21) Appl. No.: 13/532,933

(22) Filed: Jun. 26, 2012

(65) Prior Publication Data
US 2012/0326654 A1 Dec. 27, 2012

(30) Foreign Application Priority Data
Jun. 27, 2011 (JP) ................................. 2011-141931

(51) Int. Cl.
*H02J 7/00* (2006.01)
*B60L 11/18* (2006.01)
(Continued)

(52) U.S. Cl.
CPC ......... *B60L 11/1816* (2013.01); *H01M 10/441* (2013.01); *H02J 7/0024* (2013.01); *H01M 10/425* (2013.01); *B60L 11/1846* (2013.01); *B60L 11/185* (2013.01); *B60L 11/1861* (2013.01); *B60L 11/1864* (2013.01); *B60L 2210/14* (2013.01); *B60L 2210/40* (2013.01); *B60L 2230/16* (2013.01); *B60L 2230/22* (2013.01); *B60L 2230/30* (2013.01); *Y02T 10/7088* (2013.01); *Y02T 10/7044* (2013.01); *Y02T 10/7005* (2013.01); *Y02T 10/7241* (2013.01); *Y02T 10/7225* (2013.01); *Y02T 10/7061* (2013.01); *Y02T 90/163* (2013.01);
(Continued)

(58) Field of Classification Search
USPC .......................... 716/101–109; 320/101–109
See application file for complete search history.

(56) References Cited

U.S. PATENT DOCUMENTS

2007/0268001 A1* 11/2007 Doll et al. ...................... 320/134
2008/0290842 A1* 11/2008 Davis et al. .................... 320/166
(Continued)

FOREIGN PATENT DOCUMENTS

| JP | 04-275031 | 3/1992 |
|----|-----------|--------|
| JP | 07-059265 | 3/1995 |

(Continued)

OTHER PUBLICATIONS

Office Action (2 pages) dated Mar. 11, 2014, issued in corresponding Japanese Application No. 2011-141931 and English translation (2 pages).

(Continued)

*Primary Examiner* — Binh Tat
(74) *Attorney, Agent, or Firm* — Nixon & Vanderhye PC

(57) ABSTRACT

A storage battery has at least battery banks, switching units, a charging terminal, a discharging terminal and a battery management unit. The battery banks form a bank structure. Each switching unit electrically connects a group of the battery banks with either the charging terminal or the discharging terminal, and disconnects the group of the battery banks from the charging terminal or the discharging terminal. The battery management unit instructs the switching units to electrically and simultaneously connect one or more battery banks to the charging terminal during charging, and to electrically and simultaneously connect one or more battery banks to the discharging terminal during discharging.

5 Claims, 3 Drawing Sheets

(51) Int. Cl.
*H01M 10/44* (2006.01)
*H01M 10/42* (2006.01)

(52) U.S. Cl.
CPC ........... *Y02T 90/169* (2013.01); *Y02T 10/7011* (2013.01); *Y02T 90/121* (2013.01); *Y02T 90/14* (2013.01); *Y02T 90/128* (2013.01); *Y02T 90/127* (2013.01); *Y04S 30/14* (2013.01)

(56) References Cited

U.S. PATENT DOCUMENTS

| 2009/0033276 | A1 | 2/2009 | Ishii | |
|---|---|---|---|---|
| 2009/0160401 | A1* | 6/2009 | Dishman et al. | 320/119 |
| 2012/0323386 | A1 | 12/2012 | Ito | |

FOREIGN PATENT DOCUMENTS

| JP | 8-308103 | 11/1996 |
|---|---|---|
| JP | 2004-364350 | 12/2004 |
| JP | 2006-79987 | 3/2006 |
| JP | 2008-089519 | 4/2008 |
| JP | 2009-055782 | 3/2009 |
| JP | 2013-5540 | 1/2013 |

OTHER PUBLICATIONS

Office Action (2 pages) dated Jul. 8, 2014, issued in corresponding Japanese Application No. 2011-141931 and English translation (2 pages).

* cited by examiner

STORAGE BATTERY

CROSS-REFERENCE TO RELATED APPLICATION

This application is related to and claims priority from Japanese Patent Application No. 2011-141931 filed on Jun. 27, 2011, the contents of which are hereby incorporated by reference.

BACKGROUND OF THE INVENTION

1. Field of the Invention

The present invention relates to storage batteries or rechargeable batteries having a bank structure equipped with a plurality of battery banks.

2. Description of the Related Art

For example, a first patent document, Japanese patent laid open publication No. JP2004-364350, discloses a conventional technique capable of reducing the overall size of a storage battery. Such a conventional storage battery has a bank structure in which two types of battery banks are installed and electrically connected in parallel together. The two types of the batteries have a different discharge function.

A second patent document, Japanese patent laid open publication No. JP2006-79987, discloses another conventional technique capable of controlling discharge of two types of batteries mounted on a motor vehicle. The conventional technique disclosed in the second patent document detects the drive state of the motor vehicle, and selects one of the batteries on the motor vehicle in order to discharge the selected battery on the basis of the detected drive state of the motor vehicle.

The first patent document and the second patent document disclose the techniques how to select and discharge one of the storage batteries mounted on the motor vehicle in order to execute the effective discharging on the basis of the detected drive state of the motor vehicle. However, the first and second patent documents do not disclose or suggest any method how to charge the batteries, and do not disclose any method how to simultaneously discharge and charge the batteries. Accordingly, these conventional techniques disclosed in the first and second patent documents do not disclose and suggest any method how to control a combination of charging and discharging the storage battery having a bank structure equipped with a plurality of battery banks.

SUMMARY

It is therefore desired to provide a storage battery having a bank structure equipped with a plurality of battery banks capable of executing easy charging and discharging control.

An exemplary embodiment provides a storage battery having a discharging terminal, a charging terminal, a plurality of battery banks, switching units and a control unit. Electric power of the storage battery is discharged externally through the discharging terminal. Electric power is charged into the storage battery through the charging terminal. The battery banks are selectively and electrically connected to the charging terminal and the discharging terminal in order to charge the selected battery bank with electric power supplied through the charging terminal, and in order to discharge electric power stored in the selected battery bank externally through the discharging terminal. The switching units can selectively connect one or more the battery banks with either the discharge terminal or the charging terminal. Further, the switching units can disconnect all of the battery banks from the discharging terminal and the charging terminal. In order to control discharging and charging of each of the battery banks, the control unit instructs the switching units during discharging so that at least one of the battery banks is discharging and instructs the switching units during charging so that at least one of the battery banks is charging.

According to the exemplary embodiment of the present invention, the storage battery has a plurality of the battery banks. Each of the battery banks is selectively and electrically connected with the discharging terminal or the charging terminal. The switching units switch the electrical connection between each of the battery banks and the discharging terminal and the charging terminal. That is, each of the battery banks in the storage battery according to the exemplary embodiment of the present invention has the following connection states:

(a) The battery bank is electrically connected with the discharging terminal;

(b) The battery bank is electrically connected with the charging terminal; and (c) The battery bank is electrically disconnected from the discharging terminal and the charging terminal simultaneously.

The control unit detects a state of charge (SOC) of each of the battery banks (or which detects a depth of discharge (DOD) of each of the battery banks), and instructs the switching units to selectively connect each of the battery banks with the discharging terminal or the charging terminal, and to disconnect them from these terminals on the basis of the detected SOC (or the detected DOD) of each of the battery banks.

Specifically, the control unit instructs the switching units so that one battery bank is electrically connected with the discharging terminal and the other battery banks are electrically disconnected from the discharging terminal. This control makes it possible to discharge one battery bank.

Further, the control unit instructs the switching units so that one or more battery banks are connected with the charging terminal in order to charge these battery banks simultaneously. For example, when one battery bank is charging, the control unit instructs the switching units that one battery bank is electrically connected with the charging terminal and the other battery banks are electrically disconnected from the charging terminal. This control makes it possible to charge one battery bank.

Still further, during discharging, it is possible for the control unit to instruct the switching units that one or more battery banks are connected with the discharging terminal. Accordingly, when there is a necessity to execute charging and discharging simultaneously, the control unit instructs the switching units that one battery bank is electrically connected with the charging terminal, and another battery bank is electrically connected with the discharging terminal. This control makes it possible to discharge one battery bank and to charge another battery bank simultaneously.

Although the storage battery according to the exemplary embodiment of the present invention has a bank structure composed of a plurality of the battery banks, it is possible for the control unit to control charging and discharging of each of the battery banks independently. This makes it possible to achieve easy control in charging and discharging of each of the battery banks.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
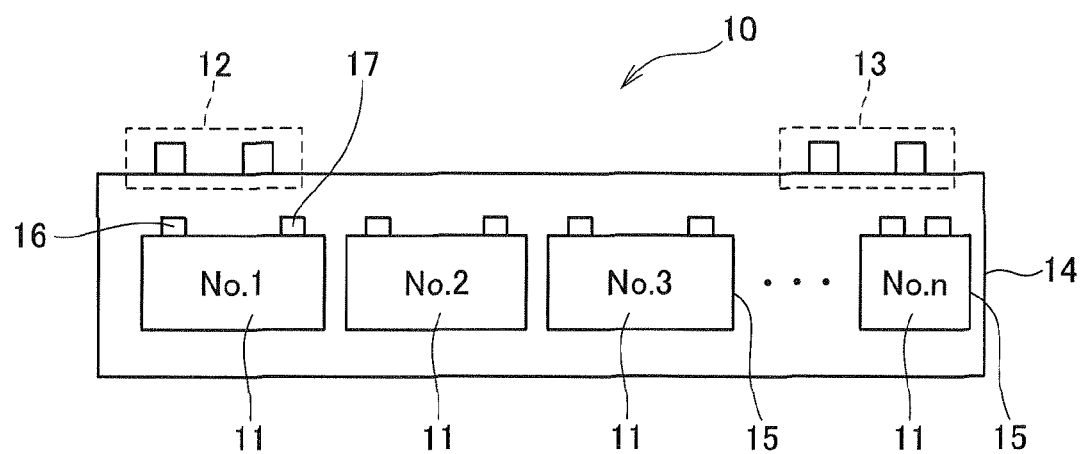
FIG. 1 is a view showing a schematic structure of a storage battery having a battery bank structure equipped with a plurality of battery banks No. 1, No. 2, No. 3, . . . , and No. n according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.
First Exemplary Embodiment A description will be given of a storage battery 10 having a battery bank structure according to a first exemplary embodiment of the present invention with reference to FIG. 1 to FIG. 6.

FIG. 1 is a view showing a schematic structure of the storage battery 10 having a battery bank structure equipped with a plurality of battery banks 11 (No. 1, No. 2, No. 3, . . . and No. n) according to the first exemplary embodiment.

As shown in FIG. 1, the storage battery 10 according to the first exemplary embodiment has a battery bank structure equipped with a plurality of battery banks 11. For example, each of the battery banks 11 is composed of a lithium ion rechargeable battery (sometimes, which will be referred to as the "Li-ion battery" or "LIB"). Lithium ion rechargeable batteries are a family of rechargeable battery types in which lithium ions move from the negative electrode to the positive electrode during discharge, and back when charging.

The storage battery 10 shown in FIG. 1 stores DC (Direct Current) electric power, and discharges the stored DC electric power. The storage battery 10 has discharging terminals 12 and charging terminals 13. The stored DC electric power is discharged to an outside device through the discharging terminals 12. On the other hand, DC electric power is charged into the storage battery 10 through the charging terminals 13.

The storage battery 10 has a plurality of the battery banks 11. The battery banks 11 form a storage bank structure. A battery case 14 accommodates the battery banks 11. The battery case 14 has a rectangular parallelepiped shape, for example, made of resin or steel.

Each of the battery banks 11 is covered with an outer case 15 made of electrical insulating resin. A positive electrode terminal 16 and a negative electrode terminal 17 of each storage bank 11 are exposed externally of the outer case 15. It is possible to easily add a battery bank into the storage battery 10 and remove the battery bank from the storage battery 10. That is, it is possible to change the number of battery banks 11 in the storage battery 10.

Figure 2:
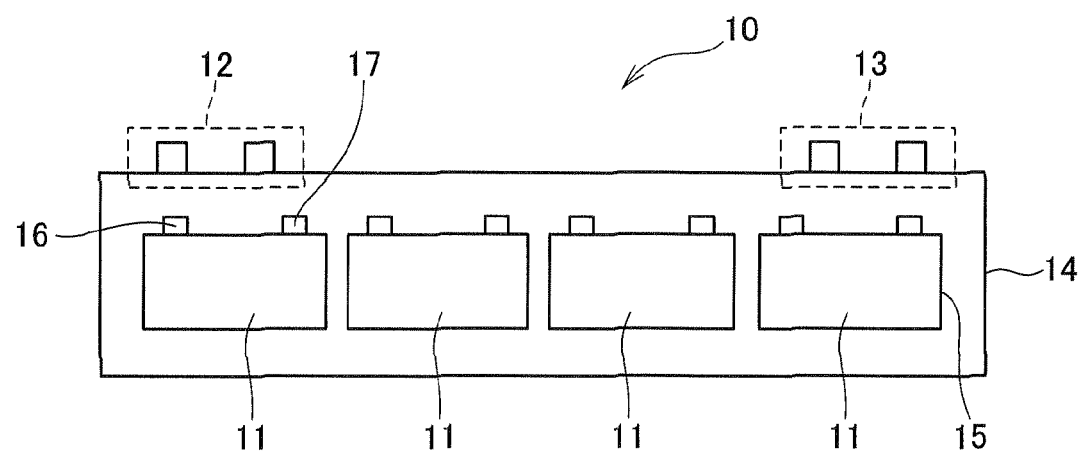
FIG. 2 is a view showing a schematic structure of the storage battery having the battery bank structure equipped with four battery banks as one example of the first exemplary embodiment of the present invention.

FIG. 2 is a view showing a schematic structure of the storage battery 10 having the battery bank structure equipped with the four battery banks 11 as one example of the first exemplary embodiment of the present invention. That is, the storage battery 10 shown in FIG. 2 has the four battery banks 11.

Figure 3:
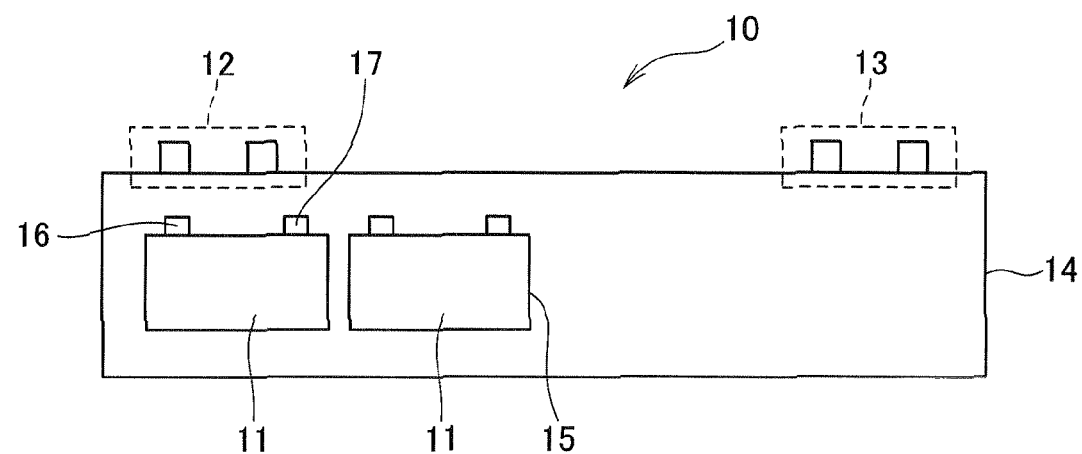
FIG. 3 is a view showing a schematic structure of the storage battery having the battery bank structure equipped with two battery banks as another example of the first exemplary embodiment of the present invention.

FIG. 3 is a view showing a schematic structure of the storage battery 10 having the battery bank structure equipped with the two battery banks 11 as another example of the first exemplary embodiment of the present invention. The storage battery 10 shown in FIG. 3 has the two battery banks 11. For example, in order to obtain the structure of the storage battery 10 shown in FIG. 3, the two battery banks 11 are removed from the structure of the storage battery 10 shown in FIG.

As shown in FIG. 1, FIG. 2 and FIG. 3, it is possible to change the number of the battery banks 11 in the storage battery 10 according to various applications. For example, it is possible to incorporate a battery bank, which is used in another device, but not used thereby, into the storage battery 10. Adding one or more battery banks 11 into the storage battery 10, namely, increasing the total number of the battery banks 11 in the storage battery 10 increases the total capacity of the storage battery 10. When the battery case 14 has a space, into which an additional battery bank 11 is installed, it is possible to add a new battery bank 11 into the storage battery 10.

Figure 4:
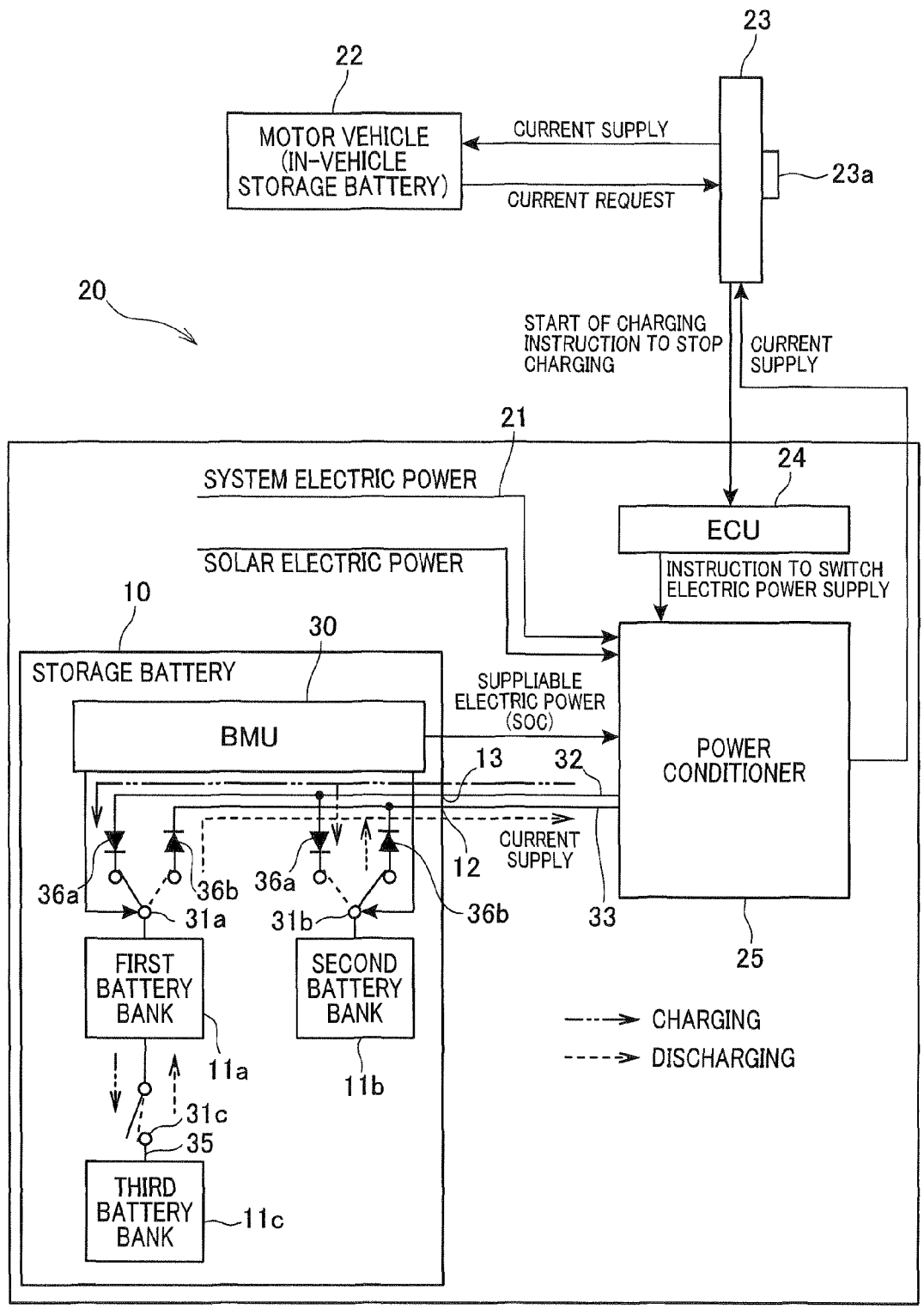
FIG. 4 is a block diagram showing a schematic structure of the charging system capable of executing a charging control of the storage battery according to the present invention.

FIG. 4 is a block diagram showing a schematic structure of a charging system 20 which controls a charging process and a discharging process of the storage battery 10. FIG. 4 shows the case in which the storage battery 10 has three battery banks 11a, 11b and 11c only. However, the concept of the present invention is not limited by the number of the battery banks in the storage battery 10. One of the improved features of the present invention allows the charging system 20 to execute the charging and discharging control to the storage battery 10 without changing the entire structure of the charging system 20.

Even if an additional battery bank 11 is added into the battery case 14, the overall size of the battery case 14 is not changed as far as there is a free space in the battery case 14 and the overall structure of the charging system 20 is not changed. That is, it is not necessary to change the entire structure of the charging system 20 even if the number of the battery banks in the storage battery 10 is changed.

The charging system 20 shown in FIG. 4 is a system capable of receiving electric power which is supplied from an electric power system on the basis of an electricity contract with a commercial electric power company such as a public utility providing electricity. The charging system 20 supplies the electric power to electric loads electrically connected to an alternative current (AC) electric power lines 21 in a building. The electric power is purchased from the electric power company and is supplied to the building through the AC electric power lines 21. For example, the charging system 20 has the AC electric power lines 21, a solar power generation system (not shown), one or more electric loads which are electrically connected to the AC electric power lines 21, an Electronic Control Unit (ECU) 24, a power conditioner 25, the storage battery 10 and an electric power charging station 23. The AC electric power lines 21 are laid in a residential building, for example. The solar power generation equipment generates solar electric power when receiving sunlight. The ECU 24 controls the components of the charging system 20.

The power conditioner 25 inverts the electric power, for example, DC electric power to AC electric power. The storage battery 10 is electrically connected with the AC electric power lines 21 through the power conditioner 25. The electric power charging station 23 charges an in-vehicle battery 22 mounted to a motor vehicle. Such a motor vehicle mounts the in-vehicle storage battery 22 having a relatively large capacity.

The solar power generation equipment is a unit for generating electric power from solar energy and supplying the generated electric power, which is different from the electric power supplied from the electric power company through AC electric power lines 21 to the power conditioner 25.

The solar power generation equipment has solar panels (not shown) installed on a roof of a building. Such a solar panel (also solar module, photovoltaic module or photovoltaic panel) is a packaged, connected assembly of photovoltaic cells. On receiving sunlight, the solar panel generates electric power.

The power conditioner 25 is electrically connected to the AC electric power lines 21. The power conditioner 25 inverts the DC electric power supplied from the solar power generation equipment to AC electric power. The power conditioner 25 supplies the inverted electric power (AC electric power) to the AC electric power lines 21.

The power conditioner 25 is electrically connected to the storage battery 10. The power conditioner 25 receives AC electric power supplied from the commercial electric power company through the AC electric power lines 21, and inverts AC electric power to DC electric power. The power conditioner 25 supplies the inverted DC electric power to the storage battery 10.

When the storage battery 10 discharges the DC electric power stored therein, the power conditioner 25 inverts the DC electric power from the storage battery 25 to AC electric power and supplies the AC electric power to the AC electric power lines 21. Further, the power conditioner 25 is electrically connected with the electric power charging station 23. The power conditioner 25 inverts the AC electric power supplied through the AC electric power lines 21 to DC electric power, and supplies the DC electric power to the in-vehicle battery 22. The in-vehicle battery 22 is charging by the DC electric power and such DC electric power is supplied to load devices.

Still further, the power conditioner 25 boosts the DC electric power supplied from the storage battery 10 and supplies the boosted DC electric power to the in-vehicle battery 22. The in-vehicle battery 22 is charging by the boosted DC electric power supplied from the power conditioner 25. Further the load devices uses the boosted DC electric power supplied from the power conditioner 25 and the in-vehicle battery 22.

The power conditioner 25 is configured to receive the optimized discharging voltage and the optimized discharging current from the storage battery 10.

Next, a description will now be given of the electric power charging station 23.

As shown in FIG. 4, the electric power charging station 23 is installed on the outside of a building, for example, on a roof of the building. The electric power charging station 23 is electrically connected with the power conditioner 25. The electric power charging station 23 supplied electric power obtained from the power conditioner 25 to the in-vehicle battery 22 mounted to a motor vehicle through a charging and discharging connector (not shown) of the in-vehicle battery 22.

The in-vehicle battery 22 has a charging and discharging cable (not shown) which extends toward the outside of the in-vehicle battery 22. A charging and discharging connector is formed at a front end of the charging and discharging cable. The charging and discharging connector corresponds to a connection terminal of the charging and discharging cable.

A communication unit and a control unit (not shown) are installed in the inside of the electric power charging station 23. Through the communication unit, the electric power charging station 23 communicates with the ECU 24. The control unit in the electric power charging station 23 executes the charging and discharging control of the electric power. The control unit communicates with the ECU 24 in order to control the charging and discharging operation of the in-vehicle battery 22.

The motor vehicle has a receptacle or a plug into which the charging and discharging connector of the charging and discharging cable is inserted and fitted. A driver of the motor vehicle pushes the charging and discharging connector of the charging and discharging cable into the receptacle of the motor vehicle in order to charge the in-vehicle battery 22.

The electric power charging station 23 has a display unit, operation switches 23a and an emergency stop button for safety. The display unit corresponds to an information unit. The driver of the motor vehicle supplies instructions to units in the electric power charging station 23 through the operation switches 23a. For example, the display unit displays various information of the in-vehicle battery 22 such as remaining capacity and a state of charge (SOC) (or a depth of discharge (DOD)) of the in-vehicle battery 22. In general, a DOD is an alternate method to indicate a battery's SOC. The DOD is the inverse of SOC. For example, one of SOC and DOC increases, the other decreases. While the SOC units are percent points (0% indicates empty, and 100% indicates a full charged state), the units for DOD can be Ah (e.g., 0 indicates a full charged state, and 50 Ah indicates empty) or percent points (100% indicates empty, and 0% indicates a full charged state.

The electric power charging station 23 starts and stops the charging of electric power to the in-vehicle battery 22 when the driver of the motor vehicle operates the operation switch 23a.

When the charging and discharging connector is inserted into the receptacle of the motor vehicle, and the driver operates the operation switch 23a of the electric power charging station 23, a current request (or a value of current requested) shown in FIG. 4 is transmitted from the motor vehicle to the electric power charging station 23. When receiving the current request transmitted from the motor vehicle, the control unit in the electric power charging station 23 transmits the received current request to the ECU 24. When receiving the current request from the electric power charging station 23, the ECU 24 controls the power conditioner 25 in order to transmit a supply current which corresponds to the current request to the electric power charging station 23. The electric power charging station 23 supplies the supply current from the power conditioner 25 to the in-vehicle battery 22 through the charging and discharging connector in order to charge the in-vehicle battery 22.

Next, a description will now be given of the ECU 24. The ECU 24 has a unit for controlling each component of the charging system 20. The ECU 24 is electrically connected with the power conditioner 25 and the electric power charging station 23 in order to communicate with them. The ECU 24 generates an instruction signal on the basis of the operation of the operator to the operation switch 23a of the electric power charging station 23, and transmits the instruction signal to a corresponding component of the charging system 20 in order to control the corresponding component.

The ECU 24 have input ports (not shown), a microcomputer (not shown), and output ports (not shown). The input ports of the ECU 24 receive various types of signals. The microcomputer executes arithmetic operations on the basis of the signals received by the input ports. The output ports of the ECU 24 output various types of control signals generated on the basis of the arithmetic results in order to control the operation of each of the components of the charging system 20.

The microcomputer (not shown) is equipped with a read only memory (ROM) and a random access memory (RAM). The ROM stores in advance various types of control programs and constant values and variable values. The RAM stores the results of the arithmetic operation of the microcomputer. The ECU 24 generates and supplies a control signal to the power conditioner 25 in order to switch a target device to which the electric power is supplied.

Next, a description will now be given of the structure of the storage battery 10. The storage battery 10 has a battery management unit (BMU) 30, a plurality of battery banks 11 (for example, the three battery banks 11a, 11b and 11c shown in FIG. 4), a plurality of switching units (FIG. 4 shows the three switching units 31a, 31b and 31c), and a plurality of diodes (FIG. 4 shows the three diodes 36a and 36b for each battery bank). As shown in FIG. 4, the storage battery 10 has the three battery banks 11a, 11b and 11c. The three battery banks 11a, 11b and 11c will be referred to as the "first battery bank 11a", the "second battery bank 11b", and the "third battery bank 11c", respectively. The storage battery 10 is electrically connected to the power conditioner 25 through a charging line 32 and a discharging line 33. The discharging terminal 12 of the storage battery 10 is electrically connected with the discharging line 33. The charging terminal 13 of the storage battery 10 is electrically connected with the charging line 32. The discharging line 33 extends from the discharging terminal 12 into the inside of the storage battery 10. The charging line 32 extends from the charging terminal 13 into the inside of the storage battery 10.

The BMU 30 controls the operation of each of the switching units 31a, 31b and 31c. The BMU 30 (which corresponds to a monitor unit used in the claims) monitors the state of charge (SOC) (or the depth of discharge (DOD)) of each of the battery banks 11a, 11b and 11c, and calculates a changed level of a voltage, a change of the voltage and an increased or decreased amount of capacity of each of the battery banks 11a, 11b and 11c. Similar to the ECU 24, the BMU 30 has input parts, a microcomputer and output parts. The memory unit in the microcomputer usually stores data regarding the battery state of each of the battery banks 11a, 11b and 11c. The data regarding the battery state of each of the battery banks 11a, 11b and 11c stored in the memory unit indicate various values such as a battery voltage, a charging current and a discharging current of each of the battery banks 11a, 11b and 11c. The BMU 30 detects the SOC of each battery bank, namely, detects the charging ability and the discharging ability of each of the battery banks 11a, 11b and 11c on the basis of the data values stored in the memory unit. The BMU 30 transmits to the power conditioner 25 the information regarding the electric power.

The first battery bank 11a and the second battery bank 11b can be selectively connected with either the charging line 32 or the discharging line 33. The first switching unit 31a is electrically connected to the terminal of the first battery bank 11a. The first switching unit 31a selects one of the following states:

The terminal of the first battery bank 11a is electrically connected with the charging line 32;

The terminal of the first battery bank 11a is electrically connected with the discharging line 33; and The terminal of the first battery bank 11a is electrically disconnected from the charging line 32 and the discharging line 33.

The BMU 30 controls the switching state of the first switching unit 31a. FIG. 4 shows the switching state in which the first switching unit 31a is electrically connected with the charging line 32.

The second battery bank 11b has the same structure of the first battery bank 11a. The second switching unit 31b is electrically connected to the terminal of the second battery bank 11b. The second switching unit 31b selects one of the following states:

The terminal of the second battery bank 11b is electrically connected to the charging line 32;

The terminal of the second battery bank 11b is electrically connected to the discharging line 33; and The terminal of the second battery bank 11b is electrically disconnected from any one of the charging line 32 and the discharging line 33.

The BMU 30 controls the switching state of the second switching unit 31b. FIG. 4 shows the switching state in which the second switching unit 31b is electrically connected to the discharging line 33.

As shown in FIG. 4, the third battery bank 11c has the terminal 35 through which the third battery bank 11c is electrically connected to the first battery bank 11a. The third switching unit 31c is formed at the terminal 35 of the third battery bank 11c. The third switching unit 31c (which corresponds to the series connection switching unit used in the claims) has the following two states:

The terminal 35 of the third battery bank 11c is electrically connected in series to the first battery bank 11a; and The terminal 35 of the third battery bank 11c is electrically disconnected in series from the first battery bank 11a The BMU 30 controls the operation state of the third switching unit 31c. FIG. 4 shows that the third switching unit 31c is electrically disconnected from the terminal 35 of the first battery bank 11c. It is possible for the third switching unit 31c to connect the first battery bank 11a with the third battery bank 11c in series.

In the storage battery 10 shown in FIG. 4, a pair of the diodes 36a and 36b is installed in each of the battery banks 11a and 11b in order to prevent a current from flowing backward.

The charging diode 36a is installed on the charging line 32 so as to allow the current to flow from the power conditioner 25 to each of the battery banks 11 and 11b.

The discharging diode 36b is installed on the discharging line 33 so as to allow the current to flow from each of the battery banks 11 and 11b to the power conditioner 25.

Next, a description will now be given of the control of the BMU 30.

In the electric power charging mode, the BMU 30 selects one of the battery banks 11a, 11b and 11c in order to connect the selected battery bank with the charging line 32. When the first battery bank 11a is electrically connected to the charging line 32, the BMU 30 instructs the switching units 31, 31b and 31c so that the charging line 32 is electrically disconnected from any one of the second battery bank 11b and the third battery bank 31c. This control makes it possible to charge one battery bank only.

Next, a description will now be given of the control process of the BMU 30 in detail.

Figure 5:
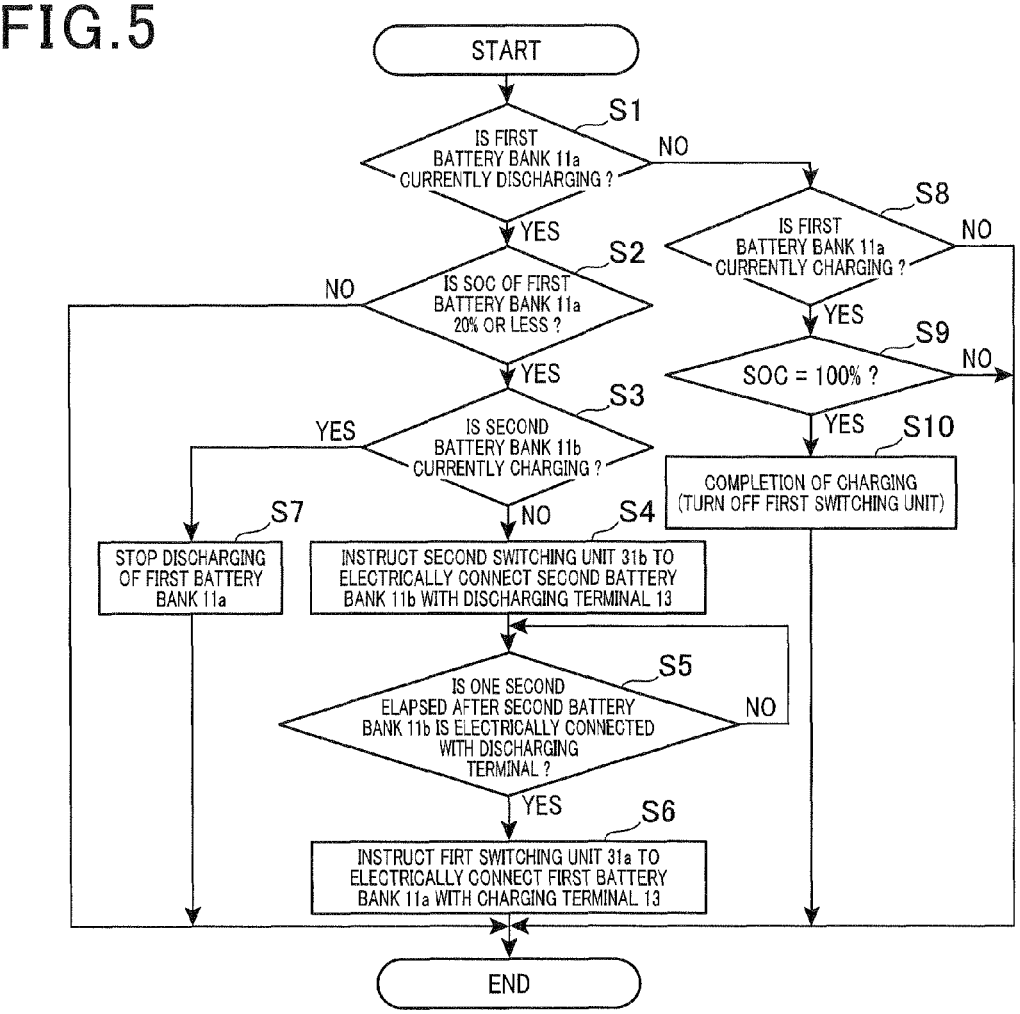
FIG. 5 is a view showing a flow chart of a process of a battery management unit (BMU) in the storage battery according to the first exemplary embodiment of the present invention.

FIG. 5 is a view showing a flow chart of the control process of the BMU 30 in the storage battery 10 according to the first exemplary embodiment of the present invention.

The BMU 30 repeatedly executes the process shown in FIG. 5. In the process shown in FIG. 5, the first battery bank 11a contains the connection state in which the first battery bank 11a is electrically connected to the third battery bank 11c. In other words, the connection state between the first battery bank 11 and the third battery bank 11c is determined in advance before the state of process shown in FIG. 5, and the connection state between the first battery bank 11a and the third battery bank 11c is not changed during the charging process or the discharging process.

When the first battery bank 11a is electrically connected in series with the third battery bank 11c, the charging process charges both the first battery bank 11a and the third battery bank 11c simultaneously, and discharging process discharges both them simultaneously.

When the process shown in FIG. 5 is started, it is detected whether the first battery bank 11a is discharging or not discharging (step S1). When the detection result indicates that the first battery bank 11a is currently discharging (or when both the first battery bank 11a and the third battery bank 11c, which are connected in series, are currently discharging ("Yes" in step S1), the operation flow goes to step S2.

On the other hand, when the detection result indicates that the first battery bank 11a is not discharging (or when both the first battery bank 11a and the third battery bank 11c, which are connected in series, are not discharging) ("No" in step S1), the operation flow goes to step S8.

In step S2, it is detected whether or not the state of charge (SOC) of the first battery bank 11a is 20% or less (as a predetermined SOC) of the maximum SOC). When the detection result in step S2 indicates that the SOC of the first battery bank 11a is 20% or less ("Yes" in step S2), the operation flow goes to step S3.

(It is also possible to detect whether or not the depth of discharge (DOD) of the first battery bank 11a is not less than a predetermined DOD. In this case, when the detection result in step S2 indicates that the DOD of the first battery bank 11a is not less than the predetermined DOD ("Yes" in step S2), the operation flow goes to step S3. The case of using such a DOD is omitted here because the method of using the SOC is the same of that of using the DOD.)

On the other hand, when the detection result in step S2 indicates that the SOC of the first battery bank 11a is 20% or less ("No" in step S2), the process shown in FIG. 5 is completed.

In step S3, it is detected whether or not the second battery bank 11b is charging. When the detection result in step S3 indicates that the second battery bank 11b is charging ("Yes" in step S3), the operation flow goes to step S7.

On the other hand, when the result of the detection executed in step S3 indicates that the second battery bank 11b is not charging ("No" in step S3), the operation flow goes to step S4.

In step S7, the charging process to the first battery bank 11a is stopped, and the process shown in FIG. 5 is completed.

In step S7, the first battery bank 11a has a small value of the SOC, namely, of 20% or less. Because the second battery bank 11b is currently charging, it is impossible to discharge the second battery bank 11b. In this case, the discharging of the first battery bank 11a is accordingly stopped.

Instep S4, because the second battery bank 11b is not charging, the BMU 30 instructs the second switching unit 31b to be switched to the discharging terminal 12. The operation flow goes to step S5.

In step S5, it is detected whether or not a predetermined time period (for example, one second) counted from the execution time of the process in step S4 has been elapsed.

When the detection result in step S5 indicates that the predetermined time period has been elapsed ("Yes" in step S5), the operation flow goes to step S6.

On the other hand, when the detection result in step S5 indicates that the predetermined time period has not been elapsed ("No" in step S5), the process in step S5 is repeatedly executed until the predetermined time period is elapsed.

In the process in step S5, the first battery bank 11 having the SOC of 20% or less and the second battery bank 11b are discharging simultaneously.

In step S6, the BMU 30 instructs the first switching unit 31a to connect with the charging terminal 13. After step S6, the process shown in FIG. 5 is completed. Continuing the discharging of the first battery bank 11a having the SOC of 20% or less causes exhaustion of the electric energy in the first battery bank 11a. However, because the second battery bank 11b has already been discharged, the BMU 30 instructs the switching units to charge the first battery bank 11a.

Because the first battery bank 11a is not discharging, the BMU 30 detects whether or not the first battery bank 11a is currently charging (step S8). When the detection result in step S8 indicates that the first battery bank 11a is currently charging ("Yes" in step S8), the operation flow goes to step S9.

On the other hand, when the detection result in step S8 indicates that the first battery bank 11a is not currently charging ("No" in step S8), the BMU 30 completes the execution of the process shown in FIG. 5 because the first battery bank 11a is not charging and discharging and it is not necessary to control the SOC of the first battery bank 11a.

In step S9, because the first battery bank 11a is currently charging, the BMU 30 detects whether or not the SOC of the first battery bank 11a reaches 100%. When the detection result in step S9 indicates that the SOC of the first battery bank 11a reaches 100% ("Yes" in step S9), the operation flow goes to step S10.

On the other hand, when the detection result in step S9 indicates that the SOC of the first battery bank 11a does not reach 100% ("No" in step S9), the BMU 30 completes the process shown in FIG. 5.

When the first battery bank 11a has a small capacity, i.e., a low SOC and the second battery bank 11b is not charging, the BMU 30 switches the discharging control of the second battery bank 11b from the first battery bank 11a. During the switching, the BMU 30 instructs the first battery bank 11a and the second battery bank 11b so that the first battery bank 11a and the second battery bank 11b are discharging simultaneously until it passes for one second while considering an average voltage value, a rising voltage rate and a falling voltage rate of the first battery bank 11a and the second battery bank 11b. This control makes it possible to prevent the battery banks from being interrupted simultaneously.

The BMU 30 executes the charging control of the second battery bank 11b by the same process of the first battery bank 11a shown in FIG. 5. Specifically, in order to show the charging control of the second battery bank 11b, it is possible to exchange the first battery bank 11a and the second battery bank 11b, respectively, in the flow chart shown in FIG. 5.

The BMU 30 executes various control processes, for example, executes the second switching unit 31b so that the second battery bank 11b is discharging during the charging of the first battery bank 11a. This control makes it possible to execute the charging process and the discharging process simultaneously in view of the entire of the storage battery 10. The BMU 30 controls the battery banks so that one battery bank is charging and another battery bank, which is not charging, is discharging. Simultaneously, the BMU 30 controls the battery banks so that one battery bank is discharging and another battery bank, which is not currently discharging, is charging.

Next, a description will now be given of the time when the two battery banks are simultaneously discharging under the control of the BMU 30.

Figure 6:
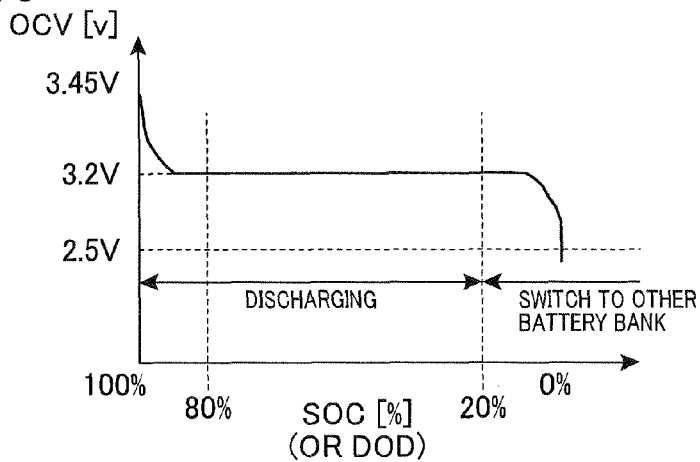
FIG. 6 is a view showing a relationship between a State Of Charge (SOC) and an Open Circuit Voltage (OCV) per a cell of one battery bank in the storage battery according to the first exemplary embodiment of the present invention.

FIG. 6 is a view showing a relationship between a State Of Charge (SOC) and an Open Circuit Voltage (OCV) per one cell in one battery bank in the storage battery 10 according to the first exemplary embodiment of the present invention.

In general, there is a correlation between OCV and SOC. As shown in FIG. 6, the OCV of the battery bank has a constant average voltage when the SOC of the battery bank is within a range of 20% to 80%. The range of the SOC of the battery bank is in preferable from 20% to 80%. The constant average voltage of the OCV of each cell of the battery bank is approximately 3.2 volts, for example.

The BMU 30 estimates the SOC of the first battery bank 11a by using a coulomb counting method which calculates an integrated value of electrical charges (current) into and from the first battery bank 11 in order to the SOC of the first battery bank 11a.

When the estimated SOC of the first battery bank 11a is 20% or less, the BMU 30 judges it being the time to switch to another battery bank from the first battery bank 11a while considering an error of the estimated SOC. Thus, it is possible to suppress the voltage drop of the battery banks at the bank switching timing as low as possible (namely, within the minimum voltage drop).

It is possible to minimize the voltage drop in the battery banks when the battery bank under the charging or discharging process is switched to another battery bank. As previously described, when the SOC of the target battery bank is 20% or less, the BMU 30 instructs the other battery banks to discharge simultaneously.

As previously described, the storage battery 10 has a plurality of the battery banks. Each of the battery banks is electrically connected to either the discharging terminal 12 or the charging terminal 13. The switching units 31a, 31b and 31c switch the connection between the battery banks and the terminals 12 and 13. For example, one battery bank has the following connection states:

(a) The battery bank is electrically connected to the discharging terminal 12;

(b) The battery bank is electrically connected to the charging terminal 13; and (c) The battery bank is electrically disconnected from the discharging terminal 12 and the charging terminal 13 simultaneously.

The BMU 30 (which corresponds to the control unit used in the claims) controls the switching state of the switching units 31a, 31b and 31c so as to control the charging and discharging of each battery bank on the basis of the SOC thereof.

Specifically, during the discharging process, the BMU 30 controls the switching units 31a, 31b and 31c so that one or more battery banks are simultaneously discharging. Accordingly, the BMU 30 controls the switching units 31a, 31b and 31c so that one battery bank is electrically connected to the discharging terminal 12, and the other battery banks are electrically disconnected from the discharging line 12. This makes it possible to discharge one battery bank only.

On the other hand, during the charging process, the BMU 30 controls the switching units 31a, 31b and 31c so that one or more battery banks are charging. Accordingly, the BMU 30 controls the switching units 31a, 31b and 31c so that one battery bank is electrically connected to the charging terminal 13, and the other battery banks are electrically disconnected from the charging terminal 13. This makes it possible to charge one battery bank only.

Further, in order to execute the discharging, the BMU 30 controls the switching units 31a, 31b and 31c so that two or more battery banks are electrically connected to the discharging terminal 12.

Accordingly, when the BMU 30 executes the charging and the discharging are simultaneously, the BMU 30 controls the switching units 31a, 31b and 31c so that the first battery bank 11a is electrically connected to the charging terminal 13 and the second battery bank 11b is electrically connected to the discharging terminal 12. This makes it possible to execute the discharging and the charging of the battery banks simultaneously.

The BMU 30 has the function of monitoring the state of each of the battery banks in the storage battery 10, for example, of monitoring at least the SOC of each of the battery banks.

On monitoring the SOC of each of the battery banks in the storage battery 10, when a repetition of charging and discharging is executed around an average voltage (as a nominal voltage of the charging and discharging characteristics of each battery bank, for example, 3.3 volts in the example shown in FIG. 6), it is difficult for the BMU 30 to obtain an correct SOC of each battery bank because of having a less level of a voltage change around such an average voltage.

There is a coulomb counting method in order to detect the SOC of each battery bank in the storage battery 10 with high accuracy. However, there is a problem that an estimated SOC obtained by the coulomb counting method is different from an actual SOC.

In order to solve the problem, namely, to obtain a correct estimated SOC which is equal to the actual SOC, the method according to the present invention resets the value of the SOC at the time when the discharging is completed, namely, at the time when the voltage of the battery bank becomes the charging completion voltage (3.45 volts in the case shown in FIG. 6), and the method also resets the level of the SOC at the time when the charging is completed, namely at the time when the voltage of the battery bank becomes the discharging completion voltage (2.5 volts in the case shown in FIG. 6).

In the first exemplary embodiment, the storage battery 10 is composed of the three battery banks 11a, 11b and 11c, the capacity of the storage battery 10 is equal to the total sum of the capacity of each of the battery banks 11a, 11b and 11c.

In the view of energy level of the storage battery 10, the capacity of each of the battery banks 11a, 11b, 11c shown in FIG. 4 in the storage battery 10 becomes smaller than that of the capacity of a conventional storage battery having a single battery bank. In the bank structure composed of a plurality of battery banks in a storage battery, each battery bank has a battery capacity which is smaller than that of a conventional storage battery having a single battery bank. This makes it possible for each battery bank to have opportunity many times to reach the charging completion voltage and the discharging completion voltage. This increases the detection accuracy of the SOC of each of the battery banks in the storage battery 10 according to the first exemplary embodiment.

When the SOC of the battery bank 11a which is currently discharging (also referred to as the "current battery bank"), the BMU 30 in the storage battery 10 according to the first exemplary embodiment instructs the switching units 31a, 31b and 31c so that one or more other battery banks are simultaneously discharging, in addition to the battery bank which is currently discharging.

That is, when the SOC of the current battery bank 11a which is low and finally reaches over discharge, it is necessary to switch the current battery bank with one or more other battery banks in order to discharge them. However, when the discharging of the current battery bank 11a is continued until this battery bank exceeds the lower cutoff voltage, namely, becomes over discharged, this causes the other battery bank to instantaneously fall into a voltage drop when the switching unit switches the current battery bank to the other battery bank after the over discharge of the current battery bank.

In order to solve the problem, when the SOC of the current battery bank 11a becomes a predetermined SOC, for example, 20% or less of the optimized value, as shown in FIG. 5, the BMU 30 in the storage battery 10 according to the first exemplary embodiment instructs the switching units 31a, 31b and 31c so that the other battery bank 11b which is connected in parallel to the current battery bank 11a is simultaneously discharging. This control makes it possible to avoid occurrence of such an instantaneous voltage drop of the battery bank and to obtain a stable discharging voltage by executing the simultaneous discharge of the battery banks connected in parallel together.

Further, in the structure of the storage battery 10 according to the first exemplary embodiment, the first battery bank 11a and the third battery bank 11c are connected in series. It is possible to increase the voltage of the storage battery 10 when the third switching unit 31c connects the first battery bank 11a and the third battery bank 11c in series. The BMU 30 controls the third switching unit 31c on the basis of a necessary voltage of the storage battery 20. For example, when the BMU 30 judges that the voltage of one battery bank in the storage battery 10 does not reach a battery voltage which is necessary to execute the discharging process, the BMU 30 instructs the switching units 31a, 31b and 31c so that the first battery bank 11a is connected in series to the third battery bank 11c in order to discharge the first battery bank 11a and the third battery bank 11c.

Accordingly, when the battery voltage of the current battery bank does not reach a necessary voltage, it is possible to obtain the necessary voltage by connecting the current battery bank in series with the other battery bank. Still further, it is possible to change the battery voltage by adjusting the connection state such as a series connection between the battery banks. It is therefore possible for the storage battery 10 to be applied to various charging systems controlled by the power conditioner 25.

As previously described in detail, the storage battery 10 according to the first exemplary embodiment has the following effects:

The storage battery 10 composed of two or more battery banks which can be combined together. Further, the storage battery 10 is capable of installing one or more additional battery banks in order to increase the entire capacity of the battery 10. Still further, the storage battery 10 according to the first exemplary embodiment has the following effects.

On executing a repetition of charging and discharging of the storage battery 10, the bank structure having a plurality of battery banks increases a frequency of over discharge and full charge, and the MBU 30 resets once the calculation of the SOC of each battery bank. This makes it possible to increase the calculation accuracy of the SOC of each battery bank in the storage battery 10.

In the structure of the charging system 20 equipped with the storage battery 10 according to the first exemplary embodiment, it is possible to add an additional battery bank into the storage battery 10 in order to increase the entire capacity of the storage battery 10. This does not require changing the structure of the charging system 20, it is possible to easily add one or more additional battery banks into the storage battery 10. In other words, even if one or more battery banks are added into the storage battery 10, the outline and the size of the storage battery 10 is not changed as a battery package. This does not require changing any structure of the components in the charging system 20.

Because the storage battery 10 has the improved structure in which each of the battery banks can be connected in parallel with the discharging terminal 12 and the charging terminal 13, it is possible to charge and discharge two or more battery banks in one storage battery 10 simultaneously. This structure allows the storage battery 10 to supply electric power to the in-vehicle battery 22 mounted on the motor vehicle and to charge electric power generated by the solar power generation equipment into the storage battery 10. It is possible for the charging system 20 equipped with the storage battery 10 and the in-vehicle battery 22 to effectively use natural energy. In other words, it is possible to charge solar energy while charging electric power from the storage battery 10 to the in-vehicle battery 22. This will make possible to save electric power purchased from a commercial electric power company.

On the other hand, a conventional battery bank structure has a drawback to cause a momentary voltage drop. However, the storage battery 10 according to the first exemplary embodiment has the improved structure as previously described in which two battery banks are momentary and simultaneously discharging, and the battery banks are switched when a stable voltage is obtained. This makes it possible to prevent occurrence of the instantaneous interruption of the battery banks.

As previously described, although the storage battery 10 according to the first exemplary embodiment has a battery bank structure, it is not necessary for the ECU 24 and the power conditioner 25 to detect whether or not the storage battery 10 has the battery bank structure. The structure of the storage battery 10 according to the first exemplary embodiment allows the power conditioner 25 and the ECU 24 to execute easy control. The power conditioner 25 and the ECU 24 control the storage battery 10 according to the first exemplary embodiment by the same control method of conventional storage batteries.

Second Exemplary Embodiment

A description will be given of the storage battery according to a second exemplary embodiment of the present invention.

The concept of the present invention is not limited by the structure of the battery bank 10 according to the first exemplary embodiment previously described.

Although the first exemplary embodiment shows the storage battery 10 applied to the charging system 20, it is possible to apply the storage battery 10 to a control system other than the charging system 20.

In the structure of the storage battery 10 according to the first exemplary embodiment, each of the battery banks has the same charging and discharging characteristics. However, the concept of the present invention is not limited by the structure shown in the first exemplary embodiment. It is possible for each battery bank to have different charging and discharging characteristics.

In the structure of the storage battery 10 according to the first exemplary embodiment, the battery banks 11a and 11c are connected in series. However, the concept of the present invention is not limited by the structure shown in the first exemplary embodiment. It is possible for the storage battery 10 to have a structure in which the battery bank 11a and the battery bank 11b are connected in series, and also possible to have a structure in which the three battery banks 11a, 11b and 11c are connected in series.

Although the storage battery 10 according to the first exemplary embodiment has a series connection structure of the battery banks such as the battery banks 11a and 11c. However, the concept of the present invention is not limited by the structure shown in the first exemplary embodiment. It is possible for the storage battery 10 to have a structure in which all of the battery banks are connected in parallel.

In the structure of the storage battery 10 according to the first exemplary embodiment, the BMU 30 controls each of the battery banks 11a, 11b and 11c by turning on or off the switching units 31a, 31b and 31c. However, the concept of the present invention is not limited by the structure shown in the first exemplary embodiment. The BMU 30 can control each of groups composed of the battery banks. For example, when the storage battery 10 has six battery banks, the six battery banks are grouped to three groups and each group contains a pair of battery banks, it is possible for the BMU 30 to control each group of the battery banks. It is possible to use a fixed group in which the number of battery banks is fixed. On the other hand, it is also possible to change the number of battery banks in each group.

The concept of the present invention is not limited by the structure shown in the first exemplary embodiment which does not connect the first battery bank 11a with the third battery bank 11c in series during the charging and discharging of the first battery bank 11a. However, the concept of the present invention is not limited by the structure shown in the first exemplary embodiment. It is possible for the BMU 30 to instruct the third switching unit 31c to switch the connection state of the third battery unit 11a and the third battery unit 11c during charging and discharging of the first battery bank 11a.

(Other Features and Effects of the Present Invention)

The storage battery as another aspect of the present invention further has the monitor unit (such as the BMU 30). The monitor unit monitors at least a state of charge of each of the battery banks.

The monitor unit detects at least a state of charge (SOC) of each of the battery banks. On monitoring the SOC of each of the battery banks in the storage battery, when a repetition of charging and discharging is executed around a nominal voltage of the charging and discharging characteristics of each battery bank as an average voltage, (for example, 3.3 volts in the example shown in FIG. 6), it is difficult for the BMU 30 to obtain an correct SOC of each battery bank because of having a less amount of a capacitance change around such an average voltage. There is a coulomb counting method in order to detect the SOC of each battery bank in the storage battery with high accuracy. However, there is a problem that an estimated SOC obtained by the coulomb counting method is different from an actual SOC. In order to solve the problem, namely, to obtain a correct estimated SOC which is equal to the actual SOC, the control unit resets the value of the SOC at the time when the discharging is completed, namely, at the time when the voltage of the battery bank becomes the charging completion voltage, and the control unit also resets the value of the SOC at the time when the charging is completed, namely at the time when the voltage of the battery bank becomes the discharging completion voltage.

In the exemplary embodiment, the storage battery is composed of a plurality of the battery banks, the capacity of the storage battery is equal to the sum of the capacity of each of the battery banks. In the view of amount of energy of a storage battery, the capacity of each of the battery banks in the storage battery according to the first exemplary embodiment is smaller than that of the capacity of the conventional storage battery. Discharging the battery bank increases the number of opportunity to reach the charging completion voltage and the discharging completion voltage. This makes it possible to increase the detection accuracy of the SOC of each of the battery banks in the storage battery.

In the storage battery as another aspect of the present invention, the monitor unit detects whether or not a state of charge (SOC) or a depth of discharge (DOD) of the battery bank which is currently discharging becomes not more than a predetermined state of charge of the maximum state of charge. Further, when the detection result of the monitor unit indicates the state of charge (SOC) of the battery bank which is currently discharging becomes not more than the predetermined state of charge (or when the detection result of the monitor unit indicates that the depth of discharge (DOD) of the battery bank which is currently discharging becomes not more than the predetermined DOD), the control unit instructs the switching units so that one or more the battery banks are electrically connected in parallel with the discharging terminal in addition to the battery bank which is currently discharging through the discharging terminal, and these battery banks in addition to the battery bank which is currently discharging are discharging simultaneously.

In particular, when detecting that the state of charge of the current battery bank (which is currently discharging), becomes not more than the predetermined state of charge, the control unit instructs the switching units so that one or more battery banks (which are not currently discharging), are simultaneously discharging while the discharging of the current battery bank is continued. After this control, when the state of charge of the current battery bank becomes a smaller level of voltage and reaches over discharge, it is necessary to switch the current battery bank to another battery bank. When the current battery bank (which is currently discharging), is switched to another battery bank after the state of charge of the current battery bank reaches over discharge, there is a problem to instantaneously cause a voltage drop of other battery bank when the switching unit switches the current battery bank (which is currently discharging), to the other battery bank after the current battery bank becomes over discharge. In order to solve the problem, the control unit according to the exemplary embodiment instructs the switching units when the state of charge (SOC) of the current battery bank becomes not more than a predetermined state of charge (for example, which is a value of 20% of the maximum SOC) (or when the DOD gets to 20% of the maximum SOC), which is shown in the first exemplary embodiment so that the other battery bank which is connected in parallel to the current battery bank is simultaneously discharging. This control process of the exemplary embodiment makes it possible to avoid such an instantaneous voltage drop of the battery banks and to obtain a stable discharging voltage by executing the simultaneous discharge of the battery banks connected in parallel.

In the storage battery as another aspect of the exemplary embodiment of the present invention, at least the two battery banks are electrically connectable in parallel with the discharging terminal, and at least the two battery banks are electrically connectable in series. The storage battery further has a series connection switching unit which makes a series connection between the battery banks, which are connectable in series, and of releasing the series connection between the battery banks. The control unit controls the series connection switching unit on the basis of a necessary battery voltage in order to execute charging and discharging of the battery banks.

In the structure of the storage battery, the control unit instructs the series connection switching unit to connect at least battery banks in series. The control unit controls the switching state of the series connection switching unit on the basis of a necessary battery voltage. For example, when the control unit judges that the voltage of one battery bank does not reach the necessary battery voltage, the control unit instructs the series connection switching unit so that the battery banks are connected in series and the battery banks connected in series are discharging. When the battery voltage of the current battery bank is low, namely does not reach the necessary battery voltage, the control unit makes the series connection between the battery banks in order to obtain the necessary discharge voltage. Further, the control unit changes the battery voltage of the storage battery by making the series connection between the battery banks and releasing the series connection of the battery banks. This control makes it possible to apply the storage battery according to the exemplary embodiment to various systems having a different voltage. Further, this control makes it possible to increase the universal use of the storage battery.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A storage battery comprising:
    a discharging terminal through which electric power of the storage battery is discharged;
    a charging terminal through which electric power is charged into the storage battery;
    a plurality of battery banks which are selectively and electrically connected to either the discharging terminal or the charging terminal in order to charge the battery bank with electric power supplied through the charging terminal and to discharge of the battery bank through the discharging terminal;
    switching units configured to connect each of the battery banks with one of the discharge terminal and the charging terminal, and to disconnect each of the battery banks from the discharge terminal and the charging terminal;
    a monitor unit configured to monitor at least a state of charge and an open circuit voltage of each of the battery banks, and detect whether or not the open circuit voltage of the battery hank which is currently discharging is within around of an average voltage value and the state of charge of the battery bank which is current discharged is not more than a predetermined state of charge of the battery bank; and
    a control unit configured to control discharging and charging of each of the battery banks, instruct the switching units during discharging so that at least one of the battery banks is discharging and instruct the switching units during charging so that at least one of the battery banks is charging; and
    wherein when the detection result of the monitor unit indicates that the open circuit voltage of the battery banks which is currently discharging is within around of the average voltage value and the state of charge of the battery bank is not more than the predetermined state of charge, the control unit instructs the switching units so that one or more the battery banks which are not currently discharging are electrically connected parallel to the discharging terminal in addition to the battery bank which is currently discharging through the discharging terminal, and these battery banks which are not currently discharging in addition to the battery bank which is currently discharging are discharging simultaneously.

2. The storage battery according to claim 1, wherein at least the two battery banks are electrically connectable in parallel with the discharging terminal, and at least the two battery banks are electrically connectable in series, wherein
    the storage battery further comprises a series connection switching unit which is configured to make a series connection between the battery banks, which are connectable in series, and to release the series connection between the battery banks, and the control unit is configured to control the series connection switching unit on the basis of a battery voltage required to charge and discharge each of the battery banks.

3. The storage battery according to claim 1, wherein the predetermined state of charge is 20% or less of the maximum state of charge of the battery bank which is currently discharging.

4. The storage battery according to claim 1, wherein the monitor unit is configured to detect whether or not the battery bank which is currently discharging becomes not less a predetermined depth of discharge,
    when the detection result of the monitor unit indicates the depth of discharge of the battery bank which is currently discharging becomes not less than the predetermined depth of discharge, the control unit instructs the switching units so that one or more the battery banks are electrically connected in parallel to the discharging terminal in addition to the battery bank which is currently discharging through the discharging terminal, and these battery banks in addition to the battery bank which is currently discharging are discharging simultaneously.

5. The storage battery according to claim 1, wherein
    the control unit is configured to reset a value of the state of charge of the battery bank to a voltage of a charging completion voltage at a timing when the monitoring unit detects that the state of charge of the battery bank reaches the charging completion voltage, and reset a value of the state of charge of the battery bank to a voltage of a discharging completion voltage at a timing when the monitoring unit detects that the state of charge of the battery bank reaches the discharging completion voltage.

* * * * *